United States Patent [19]

Hennessey et al.

[11] 4,388,987
[45] Jun. 21, 1983

[54] HYDROMECHANICAL TRANSMISSION EMPLOYING LOCKUP CLUTCH

[75] Inventors: Richard G. Hennessey, Oak Lawn; Richard B. Beemer, Lombard; Harold W. Melles, Downers Grove, all of Ill.

[73] Assignee: International Harvester Co., Chicago, Ill.

[21] Appl. No.: 240,040

[22] Filed: Mar. 3, 1981

[51] Int. Cl.³ ............................................. F16D 25/10
[52] U.S. Cl. ................................. 192/3.26; 192/3.31; 192/3.58; 192/87.12
[58] Field of Search ...................... 192/3.26, 3.31, 3.3, 192/3.29, 3.28, 0.033, 103 R, 103 F, 3.58, 87.12, 87.13, 109 F; 74/731, 752 R, 752 A

[56] References Cited

U.S. PATENT DOCUMENTS 3,390,594 7/1968 Gillespie ....................... 192/3.31 X
3,949,847 4/1976 Hoehn ......................... 192/109 F X
4,056,177 11/1977 Ahlen et al. .................. 192/3.31 X
4,131,184 12/1978 Rumyantsev et al. .......... 192/3.3 X
4,208,929 6/1980 Heino et al. ....................... 74/731

Primary Examiner—George H. Krizmanich
Attorney, Agent, or Firm—John W. Gaines; F. David AuBuchon

[57] ABSTRACT

A transmission system particularly usable for transmitting power from an internal combustion engine to the driving wheels of a vehicle such as a tractor includes a multiple ratio mechanical range transmission coupled to an infinitely variable ratio hydromechanical transmission via a manually operable master clutch. A high slip fluid coupling is used to couple the hydromechanical transmission to the engine, and an electronically controlled lockup clutch locks the impeller of the fluid coupling to the output turbine when the speed of the engine exceeds a first predetermined speed, and maintains the coupling locked until the speed of the engine drops below a second substantially lower predetermined speed.

14 Claims, 2 Drawing Figures

HYDROMECHANICAL TRANSMISSION EMPLOYING LOCKUP CLUTCH

BACKGROUND OF THE INVENTION

1. Field of the Invention

This invention relates generally to rotary power transmission systems, and more particularly to transmissions utilizing a fluid coupling and a lockup clutch to lock the impeller and output turbine of the fluid coupling together under predetermined operating conditions. Even more particularly, the present invention relates to the use of such a fluid coupling and lockup clutch in combination with a hydromechanical transmission usable for high torque applications such as those encountered in transmitting power from the engine to the driving wheels of a tractor.

2. Description of the Prior Art

Hydromechanical transmissions are well known and have been used for some time in tractor applications, with a typical hydromechanical transmission being described in U.S. Pat. No. 4,138,907, which is assigned to the same assignee as the present invention. In addition, the use of lockup clutches is also known, particularly in conjunction with torque converters of automobile transmissions and the like, as described in U.S. Pat. Nos. 3,693,478; 3,809,956; 4,033,202; 4,056,177; and 4,152,984. However, no attempt has been made to utilize a lockup clutch in a fluid coupling, particularly in a fluid coupling utilized in a hydromechanical transmission such as a transmission to apply power from an engine to the driving wheels of a tractor.

In a typical tractor transmission, such as, for example, the one described in the aforesaid U.S. Pat. No. 4,138,907, the engine is coupled to a hydromechanical transmission which is, in turn, coupled to a variable ratio mechanical transmission via a master clutch. The output of the variable ratio mechanical transmission drives the driving wheels of the tractor, and the hydromechanical transmission is generally coupled directly to the flywheel of the engine, but in some instances, a fluid coupling may be used to couple the engine to the hydromechanical transmission.

While such systems have been used successfully in tractors and other vehicles, tractors employing a transmission that is directly coupled to the engine are difficult to control at low speed, and require that the master clutch be slipped when the tractor is moved slowly. Such clutch slipping results in wear and deterioration of the master clutch, and also in a bucking of the tractor.

In an attempt to improved the controllability of tractors and the like at low speed, some manufacturers have utilized a fluid coupling between the engine and transmission, because a fluid coupling has a certain amount of slip which reduces the tendency of a tractor to buck and improves low speed control. However, such slip is detrimental in that it reduces the fuel efficiency of the tractor, and thus, the design of the fluid coupling requires a trade-off between low speed operation and fuel efficiency, with greater slip favoring low speed operation at the expense of fuel efficiency.

SUMMARY OF THE INVENTION

Accordingly, it is an object of the present invention to provide a power transmission system that overcomes many of the disadvantages of the prior art power transmission systems.

It is another object of the present invention to provide a rotary power transmission that provides efficient power transfer while retaining good controllability over a wide range of engine and vehicle speeds.

It is yet another object of the present invention to provide a rotary power transmission system that is particularly suitable for low speed, high torque applications, such as tractor applications.

It is yet another object of the present invention to provide a multiple range transmission that employs a fluid coupling and lockup clutch to achieve good low speed control while maintaining high efficiency.

It is another object of the present invention to provide a high efficiency hydromechanical transmission employing a fluid coupling having an electronically controlled lockup clutch particularly suitable for tractor applications.

One advantage of the invention is that the use of the fluid coupling minimizes the shock load on the vehicle drive train when accelerating from a standstill.

Another advantage is that the incorporation of the fluid coupling reduces heat buildup and thus heat related deterioration of the master clutch with attendent increased service life.

Also an advantage of the invention is that this transmission provides excellent roading capabilities for high speed transport.

In accordance with a preferred embodiment of the invention, there is provided a hydromechanical transmission system having a variable ratio mechanical range transmission coupled to a hydromechanical transmission by means of a manually operable master clutch. The hydromechanical transmission is coupled to the engine by means of a fluid coupling, and an electronically controlled lockup clutch is used to lock the impeller of the fluid coupling to the output turbine under certain operating conditions of the vehicle. The electronic control circuit used to control the operation of the lockup clutch is responsive to engine speed, and maintains the impeller and the output turbine of the fluid coupling in an unlocked condition when the speed of the engine is below a first predetermined level to provide precise low speed handling of the vehicle. As the speed of the engine rises above the aforesaid first predetermined level, the electronic circuit serves to actuate the lockup clutch at a predetermined rate to lock the impeller and turbine of the fluid coupling together to provide efficient power transfer under normal operating conditions. The electronic circuit then maintains the impeller and output turbine in a locked position until the speed of the engine drops below a second predetermined level that is selected to be below the first predetermined level of a substantial amount in order to maintain efficient power transfer even at lower speed, high load conditions. Should the speed of the engine drop below the second predetermined level, the system will serve to unlock the lockup clutch to avoid stalling the engine and to permit smooth reacceleration. Also, the use of a lockup clutch avoids the tradeoff between efficiency and low speed control, and permits the use of a higher slip fluid coupling than could previously be used, thereby further enhancing low speed control characteristics without sacrificing power transfer efficiency.

DESCRIPTION OF THE DRAWING

These and other objects and advantages of the present invention will become readily apparent upon consideration of the detailed description and attached drawing, wherein.

DETAILED DESCRIPTION OF THE PREFERRED EMBODIMENT

Figure 1:
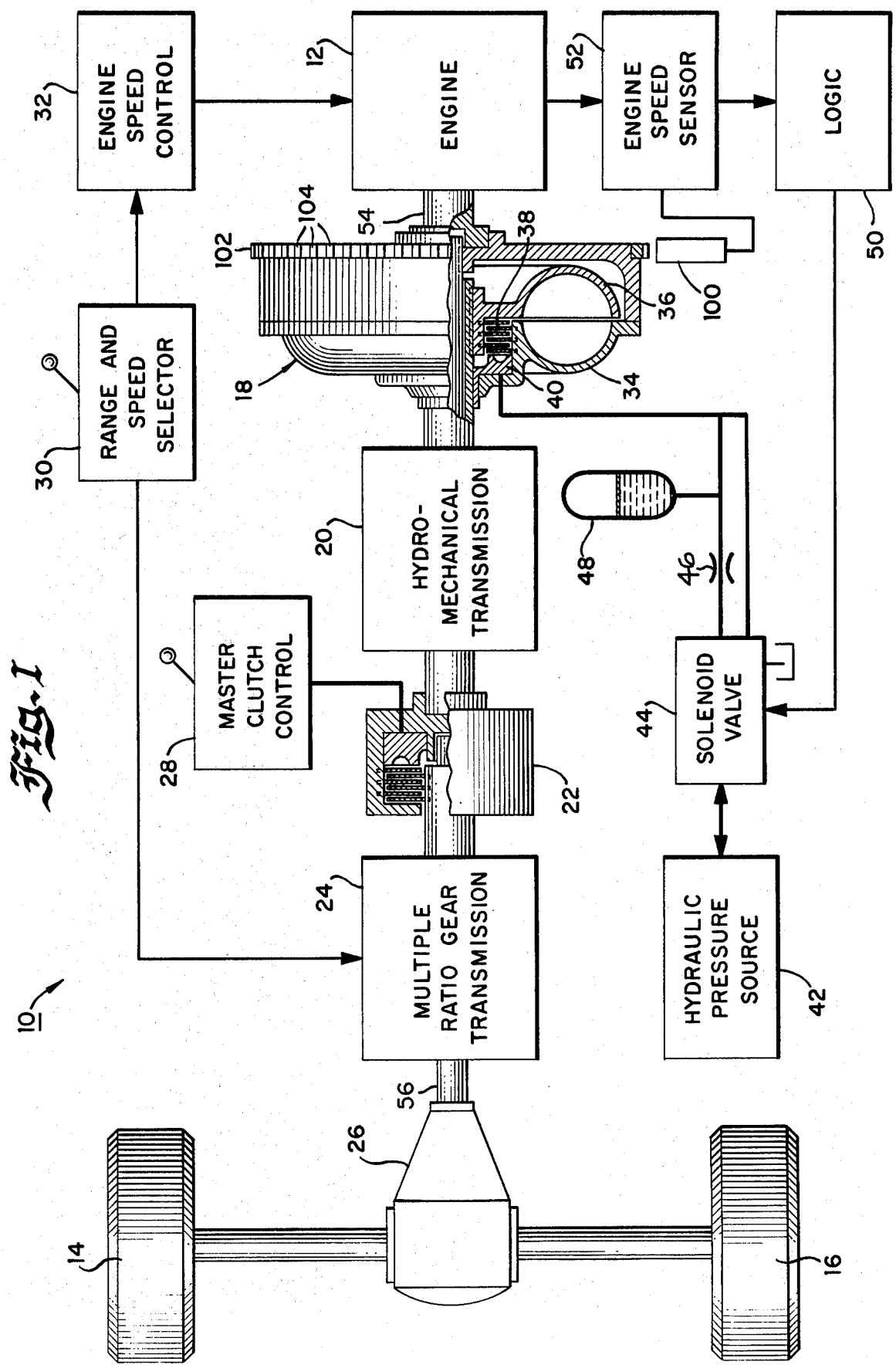
FIG. 1 is a block diagram of the transmission system according to the invention.

Referring now to FIG. 1, there is shown a block diagram of the transmission system according to the present invention, generally designated by the reference numeral 10. The system illustrated in FIG. 1 transfers power produced by an engine 12 to a set of driving wheels 14 and 16 via a fluid coupling 18, a first transmission 20, which in a preferred embodiment is a hydromechanical transmission, a master clutch 22, a second transmission 24, which in a preferred embodiment is a multiple ratio gear transmission, and a differential 26. A master clutch control 28 which may be a hydraulic or other clutch control permits manual engagement and disengagement of the master clutch 22, which in the illustrated embodiment, is shown interposed between the hydromechanical transmission 20 and the multiple ratio gear transmission 24; however, since the purpose of the master clutch 22 is selectively to interrupt the flow of power between the engine 12 and the wheel 14 and wheel 16, the master clutch may be placed at any convenient point between the engine 12 and the differential 26. A speed and range selector 30, which may be a hand movable lever, a foot pedal, or a combination of the two is used to select the desired range in the multiple ratio gear transmission and to control the speed of the engine 12, preferably by means of an engine speed control 32, which may be a governor or the like.

In accordance with an important aspect of the present invention, the fluid coupling 18 contains an impeller 34 and an output turbine 36 that may be selectively locked together by a lockup clutch 38. An engine connected input shaft 54 drives the impeller 34. The lockup clutch 38 is selectively engaged and disengaged by a clutch actuator 40, which is preferably a hydraulic clutch actuator activated by a hydraulic pressure source 42 under the control of a solenoid valve 44. A flow restrictor 46, operating in conjunction with an accumulator 48, causes the clutch actuator 40 to engage a lockup clutch 38 at a gradual, controlled rate. The lockup clutch 38 is disengaged rapidly when solenoid valve 44 diverts hydraulic clutch pressure to reservoir. The solenoid valve 44 is controlled by a logic circuit 50 which is responsive to engine speed as represented by an engine speed signal provided by an engine speed sensor 52. A power take off (not shown) may also be provided to drive auxiliary equipment; however, such a power take off would normally be coupled to the engine 12 ahead of the fluid coupling 18, and thus not be affected by the operation of the fluid coupling 18 or the lockup clutch 38.

Although the above-described system is applicable to many systems that require rotary power to be efficiently transmitted from one point to another, the system according to the invention is particularly suitable for tractor applications. Thus, the system will be described in a farm tractor environment, since its advantages are particularly apparent in a farm tractor environment.

In operation, whenever it is desired to operate the tractor, the master clutch control 28, which may include a foot pedal or the like, is used to disengage the master clutch 22 in order to interrupt the power transmission path between the engine 12 and driving wheels 14. The engine speed and range selectors are used to select the desired range in the multiple ratio gear transmission 24 and to set engine speed at idle. An output shaft 56 from the transmission 24 is connected by the differential 26 to drive the wheels 14, 16. The master clutch 22 is then engaged to permit power to be transferred between the engine 12 and the wheels 14, 16 thus permitting the tractor to move.

As the tractor begins to move, the lockup clutch 38 is maintained in a disengaged position, thereby permitting slip between the impeller 34 and the turbine 36 of the fluid coupling 18. This permits the tractor to be started smoothly and permits the speed of the tractor to be easily and accurately controlled. Because of the nature of a fluid coupling, which can transmit only a limited amount of torque at low speed, the operator can easily control the speed of the tractor simply by utilizing the brake pedal (not shown) to retard the movement of the wheels 14, 16.

Once the tractor is moving, and the speed of the engine is increased, the amount of torque transmitted by the fluid coupling increases, thereby permitting the tractor to be brought up to speed smoothly. However, once operating speed is reached, it is undesirable to permit relative motion between the impeller 34 and turbine 36 of the fluid coupling 18, since such relative motion wastes energy which must be dissipated as heat by the fluid coupling 18, and also results in an increase in fuel consumption by the engine 12.

Accordingly, an engine speed sensor 52 is used to provide a electrical signal representative of the speed of the engine 12. This engine speed signal is monitored by the logic circuit 50 which causes the lockup clutch 38 to lock the impeller 34 and the turbine 36 together to eliminate the energy loss resulting from slip in the fluid coupling 18 once operating speed has been reached. Although the lockup clutch 38 may be engaged and disengaged in a variety of ways, in the preferred embodiment, the clutch 38 is engaged and disengaged hydraulically under the control of the logic circuit 50. In the illustrated embodiment, the logic circuit 50 opens and closes the solenoid valve 44 which, when open, permits hydraulic pressure from the hydraulic pressure source 42 to flow to the clutch actuator 40, which may be a hydraulic piston, through a flow resistor 46. The flow restrictor 56 operates in conjunction with the accumulator 48 to permit pressure to build up gradually, as determined by the size of the flow restrictor 46 and the volume of accumulator 48, to thereby engage the lockup clutch 38 gradually.

Once the lockup clutch 38 has been engaged, it is desirable to maintain the clutch engaged if the speed of the engine 12 should drop below the speed at which the clutch 38 was originally engaged. This is desirable for four reasons. Firstly, it reduces the number of times that the clutch 38 must be engaged and disengaged as the speed of the engine 12 varies about the engagement point, and thus reduces wear of the clutch 38. Secondly, because of the nature of operation of a vehicle such as a tractor, the speed of the engine 12 may slow down when a higher load is placed on the tractor. Under such conditions, it is desirable to maintain the impeller 34 and the turbine 36 locked to provide maximum transfer of power through the system. Thirdly, continued clutch lockup at sustained reduced engine rpm provides fuel efficient low power field operation. Fourth, the unstable on-off cycling condition known as hunting is minimized by the substantially different engagement and disengagement speeds. Thus, once the lockup clutch 38 has been engaged, it is maintained engaged until the speed of the engine 12 drops substantially below the speed at which the clutch 38 was originally engaged. Typically, for tractor operations, the lockup clutch 38 is originally engaged once the speed of the engine 12 exceeds a higher transition speed of approximately 1400 rpm, and disengaged when the speed of approximately 1000 rpm; however, these transition speeds will vary depending on the particular vehicle used, and the intended applications of that vehicle.

Once the speed of the engine drops below the lower transition speed, the logic circuit 50 senses the reduction in engine speed and causes the solenoid valve 44 to close, thus preventing the hydraulic pressure from the hydraulic pressure source 42 from being applied to the clutch actuator 40. Simultaneously, the solenoid valve 44 will permit hydraulic fluid to flow from the clutch actuator 40 directly to the reservoir. This will result in a fast decrease in the pressure applied to the clutch actuator 40 and a rapid disengagement of the lockup clutch 38.

For roading operations the range transmission selector (not shown) is placed in high range and the hand throttle is set at idle. The tractor speed is controlled by the foot accelerator which sequentially controls both engine speed and speed transmission ratios. Pushing down and letting up on the pedal will sequence the controls without the use of the hand throttle. This will enable the tractor to be driven on the road functioning like an automatic transmission vehicle. Starting and stopping when on the road is accomplished through the use of the accelerator pedal and brakes, and the clutch pedal is not needed during this time.

In a decelerating mode on the road the operating sequence will be reversed, that is, as the accelerator pedal is released the ratio of the speed transmission will deepen to a deeper reduction while the engine rpm stays generally at the initial rate due to engine braking as the mass of the vehicle drives the engine. The lockup clutch will remain locked until the rpm eventually drops below the 1000 rpm providing sustained engine braking. After dropping below the lower disengagement speed the vehicle may be conveniently brought to a halt with only the service brakes and without stalling the engine.

When the transmission control is in reverse, the lockup clutch of the fluid coupling will be unengagable and the fluid coupling will have the capability of slipping whenever the host vehicle is in reverse. This is especially desirable when hitching up implements behind the tractor, such as when connecting a disk harrow to the tractor drawbar. The tractor will be in reverse and the fluid coupling will be utilized but not having the capability of being locked up. This could be accomplished by an electrical contact in the reverse position of the transmission control gate. Thus, even if the engine rpm exceeds the lockup transition speed, the lockup clutch of the fluid coupling will not be engaged.

Because the fluid coupling 18 is locked when the tractor is operating at normal operating speed, and thus does not introduce any inefficiencies into the system under this condition, the compromise between operating efficiency and low speed controllability is avoided. Consequently, a fluid coupling having a large amount of slip, for example, on the order of approximately 10%, may be employed to enhance low speed controllability without degrading operating efficiency. This is in contrast to a system without a lockup clutch in which the slip typically cannot exceed 3% without excessively degrading efficiency.

Figure 2:
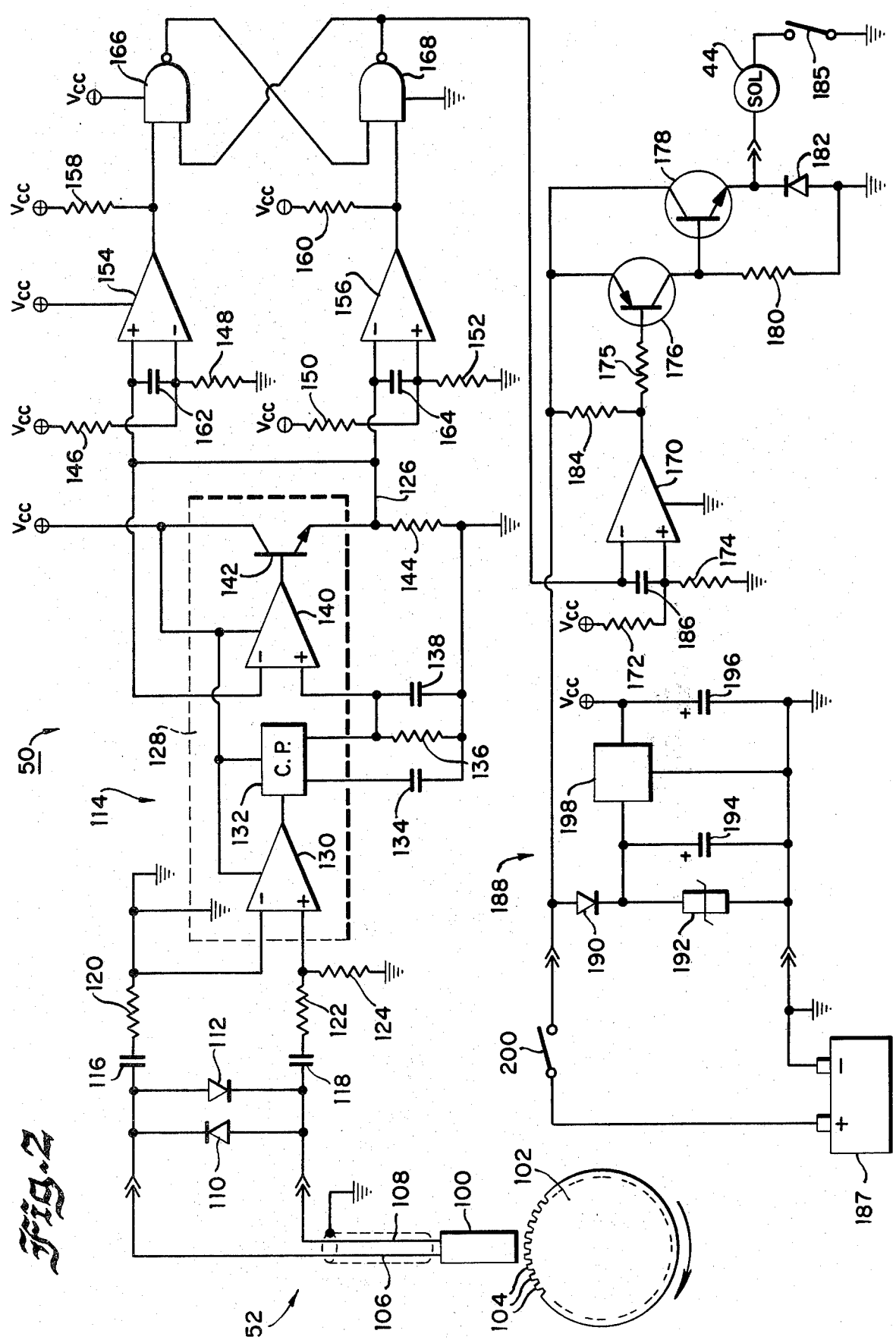
FIG. 2 is a schematic diagram of the control circuitry used to control the lockup clutch in the system according to the invention.

The logic circuit 50 is illustrated in greater detail in FIG. 2. In the circuit of FIG. 2, the logic circuit generally designated by the reference numeral 50, is connected to a pickup 100 which may be a variable reluctance magnetic pickup, an optical pickup, or any other pickup that provides a signal proportional to engine speed. In the present embodiment, the pickup 100 is a variable reluctance magnetic pickup which is placed in close proximity to a flywheel 102 of the engine 12, or to another rotating member that rotates at a speed proportional to the speed of the engine 12. The flywheel 102 has a plurality of gear teeth 104, and thus, as the flywheel 102 rotates, the magnetic field within the magnetic pickup 100 is altered as each tooth 104 is brought into and out of proximity with the magnetic pickup 100. This altering of the magnetic field within the pickup 100 causes a pulse to appear on a pair of leads 106 and 108 each time a tooth of the flywheel passes the magnetic pickup 100. The output signal from the magnetic pickup 100 is amplitude limited by a pair of diodes 110 and 112 connected across the leads 106 and 108 and applied to a frequency-to-voltage converter 114, which forms part of the engine speed sensor 52, via an input network including a pair of capacitors 116 and 118, and resistors 120, 122 and 124. The frequency-to-voltage converter 114 is responsive to the signal from the magnetic pickup 100 and provides, on a line 126, a voltage whose magnitude is proportional to the frequency of the pulses produced by the magnetic pickup 100, and consequently to the speed of the engine 12.

Various circuits may be employed to provide a voltage that varies as a function of input frequency, but in the present embodiment, it has been found convenient to utilize an integrated circuit 128 to provide this function; however, other integrated or discrete circuits may be used. The integrated circuit 128 includes an input amplifier 130 that provides a rectangular wave signal having a frequency identical to the frequency of the signal provided by the magnetic pickup 100 to a charge pump 132. The charge pump 132 is responsive to the signal from the input stage 130 and serves to either charge or discharge a capacitor 134 at a linear rate following each transition in the rectangular wave signal from the input stage 130. Since the input stage 130 produces an identical pulse each time a pulse is produced by the magnetic pickup 100, the charge on the capacitor 134 is proportional to the number of pulses received from the input stage 130, and thus to the speed of the engine 12.

The voltage on the capacitor 134, which is proportional to the charge on the capacitor 134, is filtered by an integrating network comprising a resistor 136 and a capacitor 138 in order to provide a voltage across the capacitor 138 having an amplitude proportional to the speed of the engine 12. The voltage across the capacitor 138 is amplified by an operational amplifier 140 and a transistor 142. The transistor 142 is connected with an emitter-resistor 144 in an emitter-follower configuration in order to provide a low impedance output, and provides a voltage on the line 126 that has an amplitude proportional to the speed of the engine 12.

The voltage on the line 126 is compared with a pair of reference voltages established by a pair of voltage dividers comprising resistors 146, 148 and 150, 152. The voltages at the junctions of the resistors 146, 148 and 150, 152 and representative of the engine speeds at which the lockup clutch 38 is to be locked and unlocked, with the voltage at the junction of the resistors 150 and 152 being representative of the higher transition speed of the engine 12 at which the lockup clutch 38 is initially engaged. The voltage at the junction of the resistors 146 and 148 is representative of the lower transition speed of the engine 12, i.e., the speed to which the speed of the engine 12 may be reduced before the lockup clutch 38 is disengaged.

The voltage from the frequency-to-voltage converter 114 appearing on line 126 is compared with the reference voltages at the junctions of the resistors 146, 148 and 150, 152 by a pair of comparators 154 and 156. The junction of the resistors 146 and 148 is connected to the inverting input of the comparator 154 and the output of the frequency-to-voltage converter 114 is connected to the noninverting input. Thus, when the voltage at the output of the frequency-to-voltage converter 114 exceeds the voltage at the junction of the resistors 146 and 148, the output of the comparator 154 goes high, representing a logical one. Conversely, the output of the frequency-to-voltage converter 114 is connected to the inverting input of the comparator 156 and the junction of the resistors 150 and 152 is connected to the noninverting input. Therefore, when the voltage at the output of the frequency-to-voltage converter 114 exceeds the voltage at the junction of the resistors 150 and 152, the output of the comparator 146 goes low, representing a logical zero. The resistors 158 and 160 serve as output load resistors for the comparators 154 and 156, respectively, while the capacitors 162 and 164 serve to suppress transients and to prevent oscillation of the comparators.

The outputs of the comparators 154 and 156 are connected to inputs of two cross-connected NAND gates 166 and 168. The NAND gates 166 and 168 serve as a memory which remembers whether the engine speed had previously been increased above the higher transition level required to engage the clutch, and to maintain the clutch engaged until the speed of the engine is reduced below the lower transition level if the upper transition level has been exceeded.

In operation, when the engine 12 is at idle speed, the voltage at the output of the frequency-to-voltage converter 114 is relatively low. Thus, the output of the comparator 154 is low and the output of the comparator 156 is high. This results in a high output at the output of the NAND gate 166 and a low output at the output of the NAND gate 168. As the speed of the engine is increased to a level above that represented by the voltage at the junction of the resistors 146 and 148, the output of the comparator 154 goes high. However, since the output of the NAND gate 168 is low, no change is made in the status of the outputs at the NAND gates 166 and 168. However, when the voltage at the output of the frequency-to-voltage converter 114 exceeds the high transition speed reference voltage appearing at the junction of the resistors 150 and 152, the output of the comparator 156 goes low. This results in a high output at the output of the NAND gate 168.

A further increase in the speed of the engine 12 will have no effect on the states of the comparators 154, 156 or the NAND gates 166, 168. Moreover, even if the speed of the engine 12 should drop sufficiently to drop the voltage at the output of the frequency-to-voltage converter 114 below the voltage at the junction of the resistors 150 and 152, there will be no change in the states of the NAND gates 166 and 168 even though the output of the comparator 156 will go high. However, should the speed of the engine 12 drop sufficiently to cause the voltage at the output of the frequency-to-voltage converter 114 to drop below the voltage at the junction of the resistors 146 and 148, the output of the comparator 154 will go low, and change the states of both the NAND gates 166 and 168, thereby causing the output of the NAND gate 168 to go low. Thus, the output of the NAND gate 168 is initially at a low state when the engine is at an idle and goes to a high state when the higher transition speed, represented by the voltage at the junction of the resistors 150 and 152, is exceeded. Once the voltage at the output of the NAND gate 168 goes high, it is maintained high even though the speed of the engine drops below the higher transition speed. It is not until the speed of the engine drops below the lower transition speed established by the voltage at the junction of the resistors 146 and 148 that the output of the NAND gate 168 goes low again.

The voltage at the output of the NAND gate 168 is applied to the inverting input of a comparator 170 similar to the comparators 154 and 156. A reference voltage having an amplitude between the high and low level voltages from the NAND gate 168 is applied to the noninverting input of the comparator 170 from a voltage divider comprising a pair of resistors 172 and 174. The comparator 170 serves to invert the signal from the output of the NAND gate 168 and to apply it (via a coupling resistor 175) to an amplifying circuit comprising a pair of transistors 176 and 178 and a resistor 180. A resistor 184 serves as a load resistor for the comparator 170 and a capacitor 186 serves to prevent oscillation, as in the case of the comparators 154 and 156. The emitter of the transistor 178 is connected to the solenoid valve 44 and serves to open the solenoid valve 44 in order to engage the lockup clutch 38 whenever the speed of the engine exceeds the upper transition speed, and to maintain the clutch 38 engaged until the speed of the engine drops below the lower transition speed. A diode 182 serves as a transient protection diode to protect the transistors 176 and 178 from transients generated by the solenoid valve 44 when the solenoid valve 44 is deenergized. A switch 185 is mechanically coupled to the master clutch control 28 and serves to prevent the lockup clutch 38 from being engaged whenever the master clutch 22 is disengaged.

Power for the logic circuit 50 is provided by a battery 187 within the vehicle via a voltage regulator circuit 188 comprising a reverse polarity protection diode 190, a voltage variable resistor 192, which serves as a transient suppressor, a pair of filter capacitors 194 and 196 and a series-pass voltage regulator 198. In the illustrated embodiment, the series-pass voltage regulator is an LM78L06 voltage regulator manufactured by National Semiconductor, but any suitable integrated circuit or discrete voltage regulator may be used. A switch 200, which may be part of the engine operating keyswitch of the vehicle, is used to energize the system only when the vehicle is running.

Obviously, many modifications and variations of the present invention are possible in light of the above teachings. Thus, it is to be understood that, within the scope of the appended claims, the invention may be practiced otherwise than as specifically described above.

What is claimed is:

1. A rotary power transmission for transmitting to an output shaft rotary power applied to an input shaft from a source of rotary power, said system comprising:
   a fluid coupling having an impeller and an output turbine interposed between said input shaft and said output shaft and operative to transmit power therebetween;
   a master clutch interposed between said input shaft and said output shaft, said master clutch being operative to interrupt the flow of power between said input shaft and said output shaft;
   means including a lockup clutch operable to a first condition of operation to permit relative motion between said impeller and an output turbine, said lockup clutch being operative to a second condition of operation to prevent relative motion between said impeller and said output turbine; and
   means including an electronic circuit for altering the condition of operation of said lockup clutch, said altering means responsive to the master clutch being operative to interrupt said power flow, and said altering means also being responsive to the rotary speed of said rotary power source for operating said lockup clutch from said first condition of operation to said second condition of operation when the speed of said rotary power source exceeds a first predetermined level, and vice versa when the master clutch is operative to interrupt said power flow.

2. A rotary power transmission system for transmitting to an output shaft rotary power applied to an input shaft from a source of rotary power, said system comprising:
   a fluid coupling having an impeller and an output turbine interposed between said input shaft and said output shaft and operative to transmit power therebetween;
   a master clutch interposed between said input shaft and said output shaft, said master clutch being operative to interrupt the flow of power between said input shaft and said output shaft;
   means including a lockup clutch operable to a first condition of operation to permit relative motion between said impeller and output turbine, said lockup clutch being operable to a second condition of operation to prevent relative motion between said impeller and said output turbine; and
   means including an electronic circuit for altering the condition of operation of said lockup clutch, said altering means being responsive to the rotary speed of said rotary power source;
   said system characterized wherein said altering means includes means for operating said lockup clutch from said first condition of operation to said second condition of operation when said rotary power source is accelerated to a speed above said first predetermined level and for maintaining said lockup clutch in said second condition of operation until said rotary power source is decelerated to a speed below a second predetermined level below said first predetermined level.

3. A rotary power transmission system as recited in claim 1, wherein said first predetermined level is on the order of approximately 1400 rpm.

4. A rotary power transmission system as recited in claim 3, wherein said second predetermined level is on the order of approximately 1000 rpm.

5. A rotary power transmission system as recited in claim 1, wherein said fluid coupling is a high slip fluid coupling whenever said lockup clutch therefor is prevented from being operated, and means for preventing said lockup clutch from being operated when said rotary power transmission is in a reverse operating mode.

6. A rotary power transmission system as recited in claim 5, wherein said fluid coupling has a slip on the order of approximately 10%.

7. A rotary power transmission system as recited in claim 2, wherein said electronic circuit includes means for providing an electrical speed signal proportional to the speed of said rotary power source, comparator means electrically coupled to said electrical speed signal providing means and responsive to said electrical speed signal for providing a first signal indicating that the speed of said rotary power source is above said first predetermined level and a second signal indicating that the speed of said rotary power source is below said second predetermined level, and logic means responsive to said first and second signals for providing a lockup clutch control signal operative to operate said lockup clutch to said second condition of operation when said rotary power source is accelerated to a speed above said first predetermined level, and to operate said lockup clutch from said second condition of operation to said first condition of operation when said rotary power source is decelerated to a speed below said second predetermined level.

8. A rotary power transmission system as recited in claim 7, wherein said electrical speed signal providing means includes means for providing an electrical speed signal having an amplitude proportional to the speed of said rotary power source.

9. A rotary power transmission system as recited in claim 7, wherein said electrical speed signal providing means includes means responsive to the speed of said rotary power source for providing a first signal having a frequency proportional to the speed of said rotary power source, and means responsive to said first signal for providing a second signal having an amplitude proportional to the frequency of said first signal.

10. A rotary power transmission as recited in claim 9, wherein said first signal providing means includes a magnetic pickup.

11. A rotary power transmission system as recited in claim 7, further including a solenoid valve responsive to said lockup clutch control signal, a source of hydraulic pressure, and a hydraulic actuator coupled to said lockup clutch, said solenoid valve being interposed between said source of hydraulic pressure and said actuator and responsive to said lockup clutch control signal selectively to apply hydraulic pressure from said hydraulic pressure source to said actuator in accordance with said clutch control signal.

12. A rotary power transmission as recited in claim 11, further including means including a flow restrictor and an accumulator interposed between said source of hydraulic pressure and said actuator for controlling the rate at which said actuator operates said lockup clutch between said first and second conditions of operation.

13. A rotary power transmission as recited in claim 7, further including means for preventing said lockup clutch from being operated at said second condition of operation when said master clutch is operative to interrupt the flow of power between said input shaft and said output shaft.

14. A rotary power transmission as recited in claim 7, further including means for preventing said lockup clutch from being operated at said second condition of operation when said rotary power transmission is in a reverse operating mode.

* * * * *